June 22, 1965   R. S. BRADLEY   3,190,145
VARIABLE SPEED REDUCER MECHANISM
Filed March 20, 1963
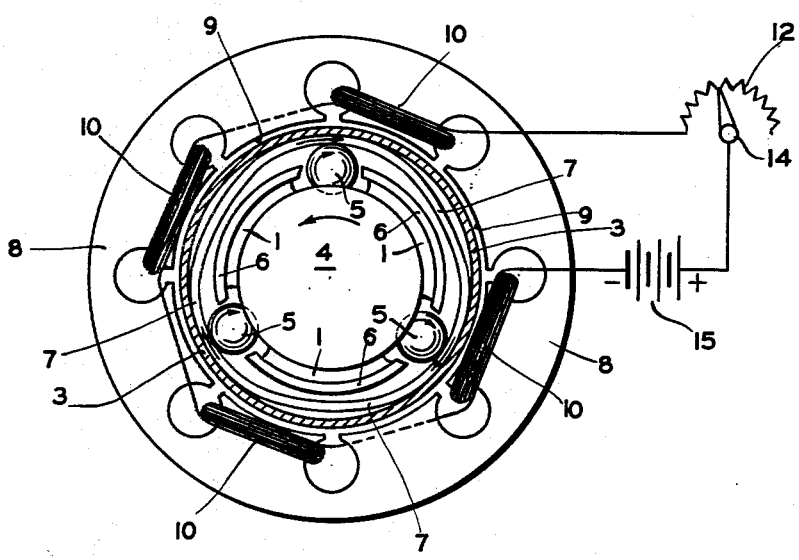
INVENTOR.
RICHARD S. BRADLEY
BY
ATTORNEY 3,190,145
VARIABLE SPEED REDUCER MECHANISM
Richard S. Bradley, Upper Saddle River, N.J., assignor to The Bendix Corporation, Teterboro, N.J., a corporation of Delaware
Filed Mar. 20, 1963, Ser. No. 266,638
4 Claims. (Cl. 74—640)

This invention relates to a variable speed reducer mechanism and more particularly to a novel means for varying the speed reduction of such a mechanism where different ratios may be required to perform different functions through the control of a magnetostriction means energized by a D.C. current.

An object of the invention is to provide a novel variable speed reducer mechanism including magnetostriction means for varying the reduction ratio of a variable speed reducer whereby a speed reduction ratio may be effected proportional to the applied current.

Another object of the invention is to provide a novel magnetostriction operating means for a variable speed reducer whereby the speed reduction ratio may be directly controlled by an applied D.C. current.

Another object of the invention is to provide a magnetostriction speed reducer having simplicity of design and a minimum number of operating parts to provide greater reliability in the operative mechanism and a mechanism particularly applicable to miniaturization.

Another object of the invention is to provide a variable speed reducer mechanism having a flexible tubular member which may be distorted by suitable actuating balls effective under centrifugal force to radially flex the tubular member so that the circumferential surface thereof contacts the inner surface of a stationary ring member under centrifugal forces acting on the actuating balls, and which mechanism further includes around the stationary ring member an electromagnetic stator effective upon electrical energization to cause the circumference of the inner and outer rings to be changed by magnetostriction so as to vary the speed reduction ratio of the variable speed reducer mechanism.

These and other objects and features of the invention are pointed out in the following description in terms of the embodiment thereof which is shown in the accompanying drawing. It is to be understood, however, that the drawing is for the purpose of illustration only and is not a definition of the limits of the invention. Reference is to be had to the appended claims for this purpose.

The drawing is a plan view of a variable speed reducer mechanism embodying the present invention.

Referring to the drawing, a driving member 4 may be connected to a motor shaft. The driving member 4 may include a groove having three actuating balls 5 rotatably mounted therein and held evenly spaced about the driving shaft circumference by suitable separators 6 affixed to the shaft 4 by flange portions 1 so arranged as to effectively space the balls 5 about the shaft 4.

There is further provided a flexible tubular member 7 formed of a suitable ferro magnetic material and operatively connected to a drive shaft. The flexible tubular member 7 may be held in place and radially distorted by the three balls 5 under centrifugal forces varying with the driven speed of the drive shaft 4. The circumference of the flexible tubular member 7 is so arranged as to contact the inner circumferential surfaces of a stationary ring 3 at the points where the balls 5 are located. Further arranged around the stationary ring 3 is an electromagnetic stator 8 which clears the stationary ring 3 by a very small clearance or air gap 9.

The device combines two fundamental mechanisms in a novel manner to provide variable speed reduction. The inner mechanism providing speed reduction by means of rolling contact of different circumferences and the outer mechanism being magnetostrictive to provide change in the circumferences of the stationary ring 3 and the flexible tubular member 7 so as to change the speed reduction ratio.

The driving member 4 and the balls 5 act as a wave generator which distorts the driven or flexible tubular member 7 causing it to contact the inner surface of the stationary ring 3.

As the driving member 4 rotates, it causes the flexible tubular member 7 to contact the stationary ring 3 progressively along its inner diameter. When the driven flexible tubular member 7 has completed one full revolution, the circumference of the flexible tubular member 7 has contacted the inner circumference of the stationary ring 3 along a length equal to the circumference of the flexible tubular member 7.

Hence, the driven flexible tubular member 7 and shaft operatively connected thereto are rotated in an opposite direction to the driving member 4, as indicated by the arrows in the drawing and a distance equal to the difference between the circumferences of the flexible tubular member 7 and the inner diameter circumference of the stationary ring 3. Thus, a reduction in ratio is effected between the driving member 4 and the flexible tubular member 7 equal to $$\pi \left( \frac{\text{I.D. Outer}}{\text{I.D. Outer-O.D. Inner}} \right)$$

By using the principles of magnetostriction, the circumferences of the inner tubular member 7 and the outer ring 3 may be changed. This is effected by providing an electromagnetic stator 8 having suitable windings 10 around the variable speed reducer and effectively energizing the windings 10 with D.C. current.

The material in the stationary ring 3 and the flexible tubular member 7 may be varied under the electromagnetic forces of electromagnetic stator 8 so as to provide the desired magnetostriction coefficients. Thus control of the speed reduction ratio of the variable speed reducer may be suitably controlled by varying the energizing D.C. current applied to the electromagnetic winding 10, as by an operator variably adjusting a resistor 12 by an operator-operative control 14 and thereby adjusting the energizing current supplied from a source of D.C. electrical energy or battery 15 to the electromagnetic windings 10.

It will be seen from the foregoing arrangement that there is provided novel means for controlling the speed reduction ratio of the variable speed reducer mechanism by varying the energizing D.C. current applied to the electromagnetic winding 10. Moreover, control of the variable speed reducer may be readily accomplished and in view of the simplicity of the design and the few number of operating parts provided, greater reliability in the operative mechanism may be effected and a mechanism readily applicable to miniaturization.

Although only one embodiment of the invention has been illustrated and described, various changes in the form and relative arrangement of the parts, which will now appear to those skilled in the art may be made without departing from the scope of the invention. Reference, therefore, is to be had to the appended claims for a definition of the limits of the invention.

What is claimed is:

1. In a variable speed reducer mechanism a drive shaft, a groove in the drive shaft, actuator balls positioned in the groove and evenly spaced about the drive shaft, a flexible tubular member positioned about the drive shaft and actuator balls rotatably mounted in the drive shaft groove, said flexible tubular member being arranged to be distorted by the actuator balls acting under centrifugal force, a stationary ring positioned about the flexible tubular member, the circumference of the flexible tubular member being arranged to contact an inner surface of the stationary ring under centrifugal forces applied to the actuator balls and an electromagnetic stator arranged about the stationary ring and effective upon energization to vary the circumferences of the stationary ring and flexible tubular member so as to effectively control the speed reduction ratio of the variable speed reducer with energization of the electromagnetic stator.

2. A variable speed reducer mechanism including a stationary member, a flexible member mounted within the stationary member, a drive shaft within the flexible member, centrifugally actuated means for driving the flexible member, said centrifugally actuated means biasing the flexible member into variable contacting relation with the inner surface of the stationary member, and electromagnetostriction means for varying the circumferences of the contacting surfaces of the stationary and flexible members so as to control the speed reduction ratio between the drive shaft and the driven flexible member.

3. The combination defined by claim 2 in which the centrifugally actuated means includes balls rotatably mounted on the drive shaft and effective to actuate the flexible member so as to drive the flexible member at a speed varying with the contacting relation thereof with the inner surface of the stationary member.

4. The combination defined by claim 3 including operator-operative means for varying electrical energization of the electromagnetostriction means and thereby the speed reduction ratio between the drive shaft and the driven flexible member.

No references cited.

DON A. WAITE, *Primary Examiner.*